United States Patent
Kramer et al.

(10) Patent No.: US 6,466,539 B1
(45) Date of Patent: Oct. 15, 2002

(54) BUS SYSTEM

(75) Inventors: Manfred Kramer, Giessen; Olaf Ziegler, Geilnau; Volkmar Schneider, Angelburg; Rainer Thüringer, Giessen, all of (DE)

(73) Assignee: ELAN Schaltelemente GmbH & Co. KG, Wettenberg (DE)

( * ) Notice: Subject to any disclaimer, the term of this patent is extended or adjusted under 35 U.S.C. 154(b) by 0 days.

(21) Appl. No.: 08/951,788

(22) Filed: Oct. 17, 1997

(30) Foreign Application Priority Data

Oct. 18, 1996 (DE) ............................. 196 43 092

(51) Int. Cl.[7] .................................................. H04J 3/14
(52) U.S. Cl. ........................................ 370/216; 370/241
(58) Field of Search ............................... 370/216, 217, 370/218, 219, 220, 221, 222, 223, 224, 227, 228, 242, 244, 245, 247, 248, 250, 251, 400, 401, 402, 246, 241, 241.1; 714/712, 713, 715, 717

(56) References Cited

U.S. PATENT DOCUMENTS

| | | | |
|---|---|---|---|
| 5,204,865 A | * 4/1993 | Moritoki et al. | 714/4 |
| 5,448,723 A | * 9/1995 | Rowett | 714/4 |
| 5,473,599 A | * 12/1995 | Li et al. | 370/219 |
| 5,784,547 A | * 7/1998 | Dittmar et al. | 714/4 |
| 5,928,368 A | * 7/1999 | Jardine et al. | 714/22 |

FOREIGN PATENT DOCUMENTS

DE 19509558 9/1996

* cited by examiner

Primary Examiner—Chau Nguyen
Assistant Examiner—Soon-Dong Hyun
(74) Attorney, Agent, or Firm—Dennison, Schultz & Dougherty

(57) ABSTRACT

Subject of the invention is a serial bus system with two data lines (10, 12), connected at one end to a central bus subscriber (14) and to an active bus subscriber at the other end (16). The central and the active bus subscriber transmits status messages over the bus (10, 12) whose bus lines are physically passed through in the bus subscribers (18, 20) between the two ends. In case of missing status messages or error in the status messages, the central bus subscriber (14) brings the bus system into a fail-safe state.

21 Claims, 4 Drawing Sheets

BUS SYSTEM

Field of the Invention

The invention refers to a bus system.

BACKGROUND OF THE INVENTION

Busses connect subscribers via electric transmission lines. The interfaces to the bus subscribers are located anywhere along the transmission line. A serial bus transmission line can consist of a coaxial or a twisted pair cable. In comparison to conventional wiring, busses represent a significant cost advantage, as well as the central availability of a wide variety of information and flexibility. Serial busses are known for example under names such as Profibus, Bitbus etc. Subscribers are for instance input and output modules for sensor signals and/or functional elements such as actuators.

For transmission of safety-critical signals only busses or bus systems of fault-tolerant or redundant design can be used. Safety-critical signals are any such signals whose purpose is safety-related and which are used to prevent or quickly rectify hazardous situations which could lead to human casualties or damage caused by electrical equipment. A redundant data bus system meeting safety requirements is described in DE-Z, messen, prüfen, automatisieren, 10/95, page 10, 12–14 and 16. In this known data bus system a fault-proof automation processor and subscribers are connected via two bus interfaces. The fault-proof automation processor consists of two processor systems containing a microprocessor, memory and system bus each. Both processor systems process the same program cycle-synchronously. A comparator which is checked in certain time intervals for perfect working order monitors both processor systems. If a fault is detected in one of the processor systems, all subscriber outputs are set to a defined signal which causes all actuators controlled by the subscribers to move into a pre-defined safe state. The fault-proof automation processors are connected to a plant bus via two automation processors. Only one of the two automation processors, both of which contain the same components, must be in working order. The automation processors run in pattern-stand-by operation. To detected a fault in the system with certainty, apart from self-tests, the communication connections and other hardware components are checked in cycles. In case of a fault, the defective automation processor is switched to a defined stop state.

A system shut-down due to a detected fault means that the machines, manufacturing plants and similar equipment is rendered harmless, i.e. brought into state where it is not hazardous to people. A fault must be detected within an error reaction time of for instance 20 ms. The emergency shut-down of electrical equipment must be effected within this time period also. A completely double bus design not only requires double two-channel bus module design for the sensors and the 2 bus masters for system monitoring and fault-proof system shut-down but also two independent wiring systems. The double bus design partly offsets a decisive advantage of a bus system in comparison to common individual wiring i.e. of every sensor switch. The double cabling, however, can be avoided by forced dynamisation of an individual bus line. This is known as dynamic redundancy, a method already known. Dynamisation means that all bus modules are continuously and cyclically polled by the processing master in relation to working order and signalling state (master-slave system) or that the modules signal themselves on a regular basis (multi-master system).

Busses in multi-master systems are able to signal immediately (i.e. in case of switch actuation) within the $\mu$sec range (so-called real-time capability) so that no continuous module polling would be required for safety monitoring of a plant. However, to detect faults in the monitoring bus system itself, for instance the failure of a bus module within the fault reaction time (e.g. 20 ms, see above), all bus module subscribers are checked as to their functionality at least once within this period of time. As the messages consist of extensive data protocols (50 . . . 80 bits) to guarantee a high degree of data transfer safety (Hamming distance 4), dynamisation means that the data flow (data transfer rate) increases proportionally in relation to the number of subscribers required for system monitoring.

On the other hand the data transfer rate of a bus system is limited due to signal propagation time (length of line) as well as module reaction times (number of subscribers).

Thus, there is a conflict between the requirement of longer lines (for instance 100 . . . 300 m) and a large number of bus subscribers, e.g. 50 . . . 100 on the one hand and the technical requirements for transmission and processing of higher data transfer rates (typical 125 . . . 1000 Kbits) on the other hand.

To reduce the data transfer rate, there is the possibility, as bus modules for a safety bus are designed as two-channel/redundant anyway, that the busses monitor each other in pairs for fault-free operation so that in case of an internal difference a subscriber of a bus module pair must send an error signal. However, the method assumes that the bus line between the processing master and every module is error-free and fully operational at any time. As the line is not intended to be doubled and/or spatially separated, it therefore must be checked dynamically up to all subscribers. A fault in the line must be detected within the fault tolerance time. Due to the high data transfer rates, cyclic checking of all bus subscribers requires so much time that the required fault reaction time cannot be met or fallen below.

Also known is a local network which is designed with two serial bus systems connected to the network nodes for redundancy reasons. Each network node is connected to both busses with two separate couplers. One of the bus systems is used to transfer process data in fault-free operation, while the other one transmits status information. Each coupler contains at least one communication controller, a communication CPU and a transceiver. Each communication CPU monitors the proper working order of the other communication CPU in a network node and thus fulfils the function of a watchdog processor. Any faults in the lines as well as malfunctioning of communication controllers will cause falsification of bus messages which are detected by error detection mechanisms. Errors occurring in the components between bus and communication CPU are detected by cyclic functional monitoring of the components. In case of a fault, each bus will be used as a watchdog bus to inform the other network subscribers of the fault detected in the other bus system. If a fault occurs in the bus system transmitting process data, the bus is locked out and the process data traffic is re-routed using the other bus (DE 195 09 558 AI).

SUMMARY OF THE INVENTION

The invention is based on the problem to provide a bus system suitable for safety-critical signals and a large number of bus subscribers as well as long bus lines, and which also has a short reaction time in case of a fault while being less expensive, and in which lines should be monitored for faults using simple measures.

This problem is solved with the invention particularly by a bus system involving a serial data bus with a transmission medium with the first active bus subscriber at the one end and the second active bus subscriber at the other end as well as further bus subscribers physically passed through by the transmission medium, whereby at least the first active bus subscriber and/or the second active bus subscriber contains a facility for regular transmission and/or receiving of status messages, whereby at least one of the subscribers monitors the status messages sent by the other bus subscribers for their non-presence within a defined period of time or for deviation from the form indicating the error-free state of the bus system, and whereby then, if the status messages are not received within the defined period of time or if status messages deviating from the form indicating a fault-free bus system are received, the bus system is brought into a state which meets defined safety criteria.

The bus system of the invention does not require polling of all bus subscribers for monitoring as there is particularly the possibility that the second active bus subscriber (terminating bus subscriber, terminating module) takes over the monitoring function of the transmission medium. This advantage is especially felt in bus systems working with active redundant multi-master modules, although the bus may only have one channel. The first active central bus subscriber or bus master transmits status messages via all bus subscribers to the second active sub subscriber at a very high clock rate ranging form 10 to 20 ms and is able to return the same or other suitable status messages at the same high clock rate if the transmission medium is in perfect condition. Alternatively, there is the possibility that the second active bus subscriber transmits status messages to the first active bus subscriber independently from the signals sent by the first active subscriber.

Regardless of the method generating the status messages transmitted by the second active bus subscriber, the transmission medium can be checked as to its proper state. Thus, the transmission medium can be checked within the time period in which an initial fault can occur and which is to kept as short as possible. The checking data transmission for the bus thus essentially occurs between the bus subscribers at either end of the bus line so that the number of subscribers has only little or no effect on the time the checking data needs to propagate through the bus. In the bus system of the invention, the bus subscribers between the central bus subscriber or bus module at the one end and the active bus subscriber or bus module at the other end of the bus are not connected to the transmission medium by spur lines. In particular, the transmission medium consists of a two wire cable. This may also include a transmission medium with one first wire and a second, conducting earth wire. Thus, when designed according this invention, the bus leads from the first active or central bus subscriber or bus module, hereinafter also referred to as bus master, physically through all bus subscribers, hereinafter also referred to as slaves, and is equipped at the end with the second active bus module, also called the terminating module. Therefore the bus consists of a galvanic line leading from the one end to the other. As spur lines to the slaves are not required, the bus is also more effective.

It is intended that the first active bus subscriber monitors the status messages of the second active bus subscriber and vice versa, and that the other bus subscribers monitor the status messages, or status messages deviating from the form indicating the error-free state of the transmission medium, generated by the other bus subscribers.

Preferably at least some of the bus subscribers contain units monitoring each other.

It is practical to implement at least some, preferably all, bus subscribers as two unit modules connected to sensors and/or actuators and which are monitoring each other. When designed in such a way, the bus subscribers are redundant. No initial fault should be expected in the bus subscribers when using this design in connection with monitoring, i.e. these bus subscribers can be dimensioned much more generously in safety terms.

As a matter of principle, the bus master is the first device in the line, the terminating bus module the last one. The bus master and terminating bus module each have only one connection to the bus, all other bus module have exactly one bus input and one bus output each.

The bus master as the first device and the bus terminating module as the last device in the line transmit and/or receive preferably independent status messages at a very high transfer rate (for instance every 10 ms). These are checked by all bus subscribers.

For practical reasons the central bus subscriber is implemented as a two-channel design. In this case a two-channel design is to be understood as a module containing two identical units. The two identical units are particularly equipped with a joint fault-proof comparator which has an output to for instance a relay level or an equally safe shut-down level which preferably can be used to switch on and off electric consumers. A relay level is to be equipped with forced-controlled relays.

In case of the absence of messages or deviating messages exceeding a defined fault tolerance time (for instance 15 ms), a faulty bus line or a defective bus subscriber must be assumed. The system will then go into a safe state.

The physical passing through of the bus line includes a fault exclusion within the bus module between bus line and two-channel bus module (as no logical passing on of the data flow is intended). This is achieved by electromechanical measures:

The inputting bus wire of the bus line is implemented at least as one conductor path on-board the two-channel bus subscriber. The bus line is passed through on this board by an etched, flat conductor path. Practically the two-channel bus controller units are also implemented on the same board which are connected directly, but independently via short spur lines to the conductor path. Both bus controller modules are monitoring each other. The galvanic connection in the bus line is to be effected in such a way as to exclude concurrent electrical separation of both bus controllers from the passed through bus line.

The on-board conductor path routing must be designed in such a way as to exclude concurrent cutting off of the spur lines between bus and the two controllers even in case of any boring through the board, or otherwise the passed through bus line must be destroyed by this action also.

This fault would then be detected by the bus system within the initial fault detection time of 15 ms.

Further details, features and advantages of the invention are not only based on the claims and the characteristics mentioned therein—on their own or as a combination—but also on the following description of a preferred application example.

DETAILED DESCRIPTION OF THE PREFERRED EMBODIMENT

Figure 1:
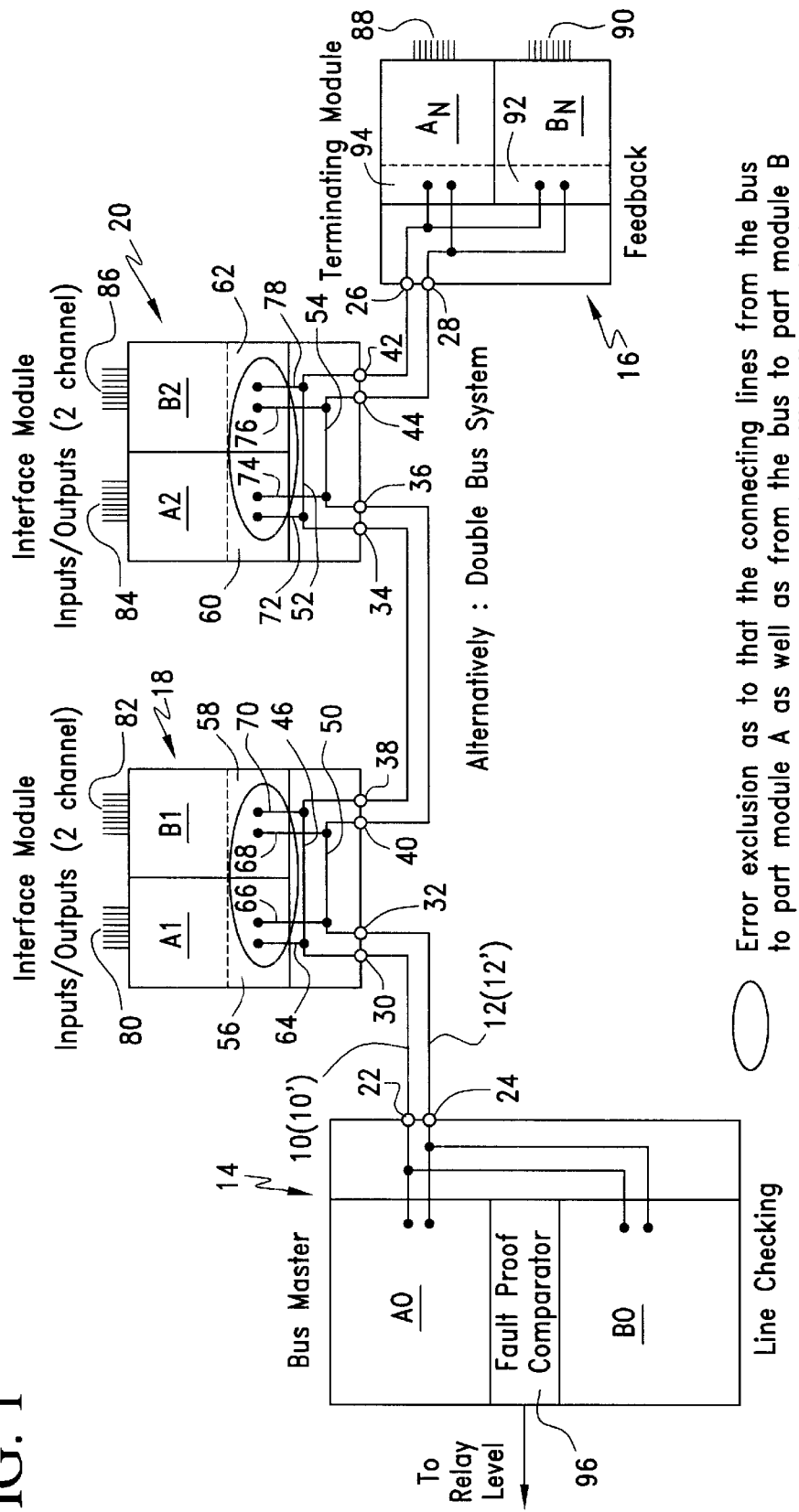
FIG. 1 shows a block diagram of a serial data bus system with which safety-critical signals are transferred or processed.

Without limiting the invention in any way, the application example describes a serial bus system with a transmission medium consisting of two identical wires 10, 12 making up the data line. (Alternatively each wire 10, 12 could be one data line 10', 12'). A central bus subscriber 14 is connected to the one end of the wires as first active bus subscriber. The central bus subscriber 14 is hereinafter also referred to as bus master 14 as it carries out central bus management tasks. A second active bus subscriber 16, also referred to as terminating subscriber 16 or terminating module 16 is connected at the other end of the two wires 10, 12. Bus subscribers of which two, 18 and 20, are depicted in the diagram, are connected with the wires 10, 12. The bus subscribers 18, 20, also referred to as slaves, can be located anywhere along the wires 10, 12 which are used for instance as field busses in a technical plant. The bus master 14, the terminating bus subscriber 16 and the bus subscribers 18, 20 are implemented with two channels, i.e. the bus master 14 contains two preferably identical units A0, B0, the active bus subscriber 16 consists of two preferably identical units $A_{N1}$ and $B_N$, and the other bus subscribers 18, 20 contain preferably identical units A1, B1 and A2, B2. Particularly safety-critical signals are transferred through the wires 10, 12 in digital form. As a matter of principle, bus master 14 is the first device or module at the respective serial bus and has a bus connection 22, 24 for each wire 10, 12. The active bus subscriber 16 is principally the last device of the bus and has only one bus connection 26, 28 for each data line. All other bus subscribers 18, 20 provide a bus input 30, 32 or 34, 36 and a bus output 38, 40 or 42, 44 for each data line. The data line or the data lines 10', 12' are physically passed through the bus subscribers 18, 20. In the diagram the passed through wires 10, 12 carry the designation 46, 50 in relation to bus subscriber 18 (slave 18) and 52, 54 in relation to bus subscriber 20 (slave 20). Outside of the bus subscribers coaxial or twisted cables can be used for the bus line. The electrical connections 46, 50 and 52, 54 are preferably implemented in the salve modules 18, 20 as on-board etched, flat conductor paths, routed between bus inputs 30, 32 and the bus outputs 38, 40 or between bus inputs 34, 36 and bus outputs 42, 44. Also located on the same boards which are not described in any detail, are intelligent bus controller modules 56, 58 or 60, 62 in units A1, B1, A2, B2. The bus controller modules 56 to 62 are connected independently to the electrical connections 46, 50 or 52, 54 using spur conductor paths or spur lines 64, 66, 68, 70 or 72, 74, 76, 78. Both controller modules 56, 58 or 60, 62 in each of the bus subscribers 18, 20 are monitoring each other. Electrical connections lead from units A1, B1, A2, B2 ... $A_{N1}$, $B_N$ to sensors and/or actuators at the relevant machine or plant. These connections at the respective units A1, B1, A2, B2, ... $A_{N1}$, $B_N$ carry the designations 80, 82, 84, 86, 88 and 90 and are preferably routed in two channels to the sensors or actuators for redundancy reasons. Due to locating connections 46, 50, 52, 54 and spur lines 64, 66, 68, 70, 72, 74, 76, 78 on-board of bus subscribers 18, 20 it is thus excluded that both bus controller modules 58, 56 or 60, 62 in the relevant bus subscriber 18, 20 can be concurrently electrically separated from the passed through data line (transmission medium). The conductor path routing is thus implemented on the board of the relevant bus subscriber 18, 20 in such a way as to exclude concurrent cutting through spur conductor paths or spur lines 64, 66, 68, 70 or 72, 74, 76, 78 during any borings through the board or otherwise, in case of such an event, the passed through data line or the transmission medium is destroyed also. The second bus subscriber 16 also includes bus controller modules 92, 94 in modules $A_{N1}$, $B_N$ which are monitoring each other and are connected to bus connections 26, 28 via spur lines, which are not described in any detail, however, meet the conditions set out above in connection with bus subscribers 18, 20. In the central bus subscriber 14 or bus master, both units A0 and B0 are connected to bus connections 22, 24 via spur lines, which are not described in any detail, however, meet the conditions set out above in connection with the line requirements for bus subscribers 18, 20. The results or signals generated by the two homogenous units A0, B0 in relation to bus monitoring are sent to the respectively other unit via galvanically separated link 96 such as an optical coupler, whereby the signals generated by units A0 and B0 are monitored for identity and synchronicity. The fault-proof comparator consists of the two homogenous units A0, B0, the galvanically separated link 96 such as an optical coupler and relays K1, K2 or a comparable circuit and controls an output level, not described in any detail, in which the power supply of the relevant device or machine or plant is located and which will interrupt the power supply in case the comparator gives the relevant signal, so that the device, machine or plant can be rendered safe. The relays or protectors have forced controlled contacts, a property where the contacts for the two relay states, i.e. the normally open and the normally closed contacts cannot be opened or closed at the same time, or similar evaluation electronics.

The central bus subscriber 14 (bus master) and the active bus subscriber 16 transmit and/or receive for instance periodically status messages via the data lines 10, 12 at a high transfer rate. The time period can be for instance 10 ms. The status messages which are particularly data in digital form reach the bus subscribers 18, 20 and are checked by these subscribers for identity or are compared with defined status information. Additionally preferably all, in particular bus subscribers 18, 20, 16 check whether the status messages were transferred or received within a defined fault tolerance time. If the status messages are not transferred or received within the fault tolerance time of for instance 15 ms, or if erroneous messages are received, a faulty bus line or a defective bus subscriber must be assumed. The fault will at least be detected in one of the bus subscribers. Every bus subscriber detecting the fault, such as bus master 14, terminating module 16 or bus subscriber 18 or 20 can initiate the system or device going into a safe state in case a fault has been detected. The safe state is for instance the standstill of the technical system, device, machine or plant or shut-down by cutting off the power supply, i.e. the application of the fail-safe principle. In general terms this means that after detection of a fault in a hazardous section, any hazardous activities such as motions, rays etc. are stopped immediately. In case of the above design, a fault reaction time is sufficiently short to meet safety requirements even with for instance a 10 ms status messages interval. A fault will be detected by the central bus subscriber within the initial fault detection time of for instance 15 ms.

The status messages are transmitted periodically by terminating module 16 and/or bus master 14 are processed by the remaining bus subscribers 20, 18, 14 or 18, 20, 16. In this way propagation times over twice the length of the relevant bus are avoided. In case the transmission medium has been interrupted or short-circuited, status messages will not be received by all bus subscribers 14, 16, 18, 20, thus the fault is detected immediately. At least one of the bus subscribers 14, 16, 18, 20 detecting the fault will initiate the shut-down of the bus system and for instance also of other consumers controlled by the bus system.

In bus subscribers 18, 20 which are implemented as input and output modules, and in the active bus subscriber 16, intelligent bus controller modules 58, 56, 60, 62 and 92, 94 check each other and will immediately generate a relevant message transmitted to the remaining bus subscribers if they detect a fault in the other unit.

The bus system described above is suitable for long bus lines with a large number of subscribers. Even with long lines and many subscribers the fault reaction time is short, thus meeting safety requirements. The bus master 14 and/or terminating module 16 regularly transmit messages to check the line which are in turn received by the other bus subscribers 16, 18, 20. The signal interval is for instance 10 ms.

Independent from the mechanism described above there is the possibility of bus master 14 regularly transmitting signals which are received by terminating module 16 and are then either returned or feedback messages are generated. The function of bus master 14 and terminating module 16 may in this case be reversed. The aforementioned designations 10, 12 referred to the wires of a data line of a bus. The aforementioned considerations are also valid for a double bus, whereby 10', 12' then refers to its two transmission media, i. e. the designations 10', 12' refer to one bus each in case of a double bus design. The busses 10', 12' then may have 2 lines each. This context is indicated in FIG. 1 by adding the designations 10', 12' in brackets to the designations 10, 12. Busses 10', 12' are equipped with 2 wires each. In case of 2 busses 10', 12' therefore there are twice as many bus connections, bus inputs, bus outputs, conductor paths between bus inputs and bus outputs, spur lines and wires between the subscribers in comparison to the design depicted in FIG. 1. It is possible to route the busses 10', 12' between the subscribers in such a way as to prevent any damage, for instance mechanical, having an effect on both busses at the same time.

In particular, the bus system can be implemented as a multi-master bus system and in this case consists of two-channel subscribers connected to a one-channel bus. Due to the active bus subscriber at the end of the bus the fault "line interruption within a subscriber" can be detected very quickly as there are only two bus subscribers.

All bus subscribers are active, i.e. they transmit independently (multi-master system). Data processing is carried out in the master. All bus subscribers independently and periodically transmit their status messages. Events (such as change of input states) are transmitted immediately without any time loss.

Due to the fault tolerance time (initial fault occurrence time) of the system (it must be able to be safely shut-down within for instance 29 ms) the bus interruption must therefore be detected with certainty within this time period.

If the bus is implemented as a line, and only the 1st module (master=content processing with customer's program) and the last module (bus termination) transmit their status messages every 10 ms, and all remaining modules every 100 ms, then only few status messages need to be transmitted per second. Thus the bus is free or events. A bus interruption can be detected by all subscribers of such a the bus system due to missing status messages of the master or terminating bus module.

In case of a defect at one of the bus subscribers transmitting slow status messages, the second fault occurrence time must be assumed as due to the consistent two-channel design a failure of one module part does not cause the failure of the entire module.

If there is only a one-channel bus, each module will receive 2 bus nodes. The data on the bus lines is equivalent. Status messages are generated in each node. At the initialisation of the system a counter starts in each node which adds one increment after each message. A control byte is transmitted also.

The two nodes of a bus module check independently the status messages transmitted on the bus. Additionally a galvanically separated link is available between the nodes which is used to exchange operational or error messages.

Figure 2:
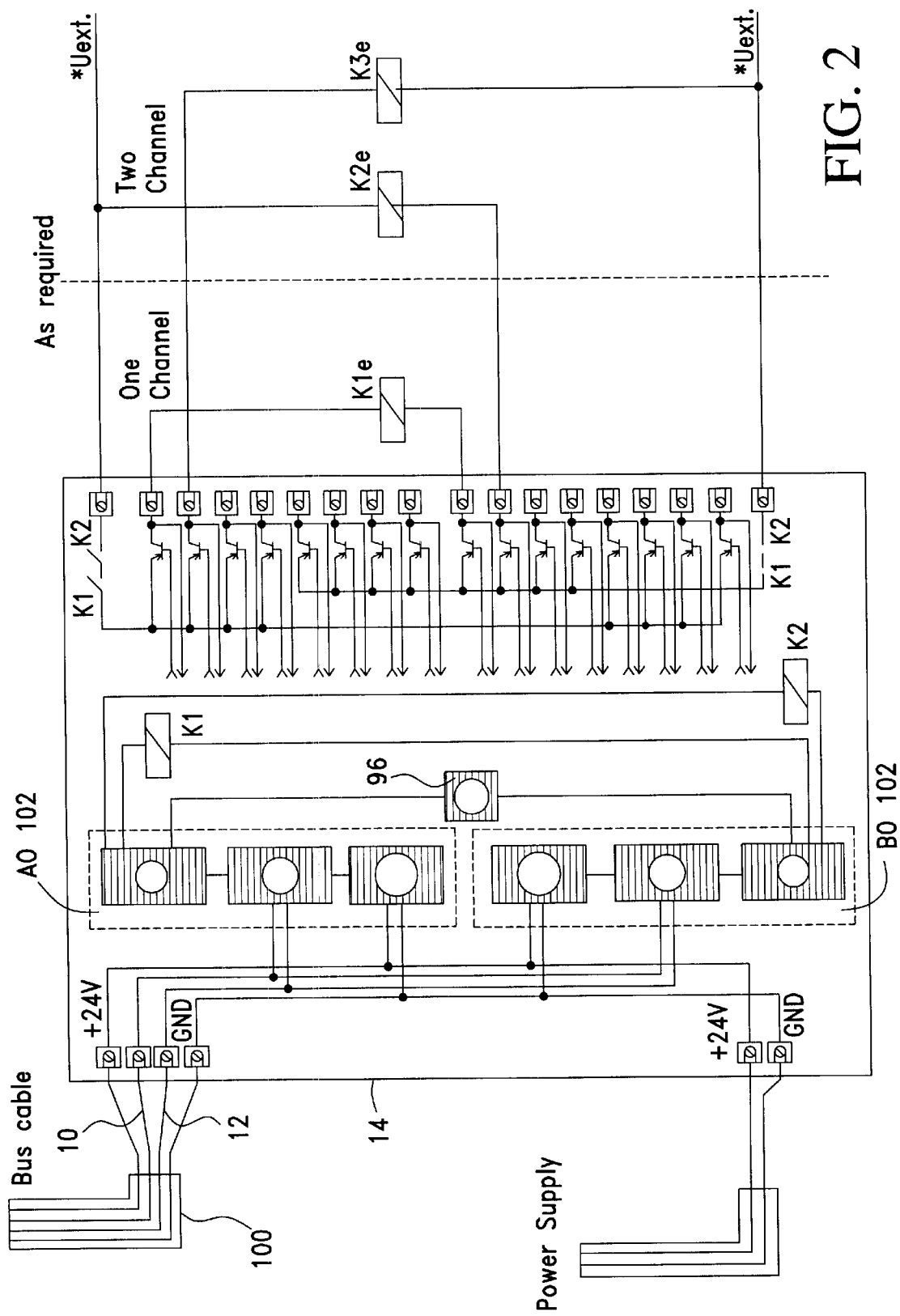
FIG. 2 shows a block diagram of a central bus subscriber.

The central bus subscriber 14 depicted in FIG. 2 is shown with a connection of bus cable 100 to the wires 10, 12. Bus cable 100 contains power supply lines not described in any detail. One CPU 102 each is contained in the two preferably identical units A0, B0 of central bus subscriber 14.

Figure 3:
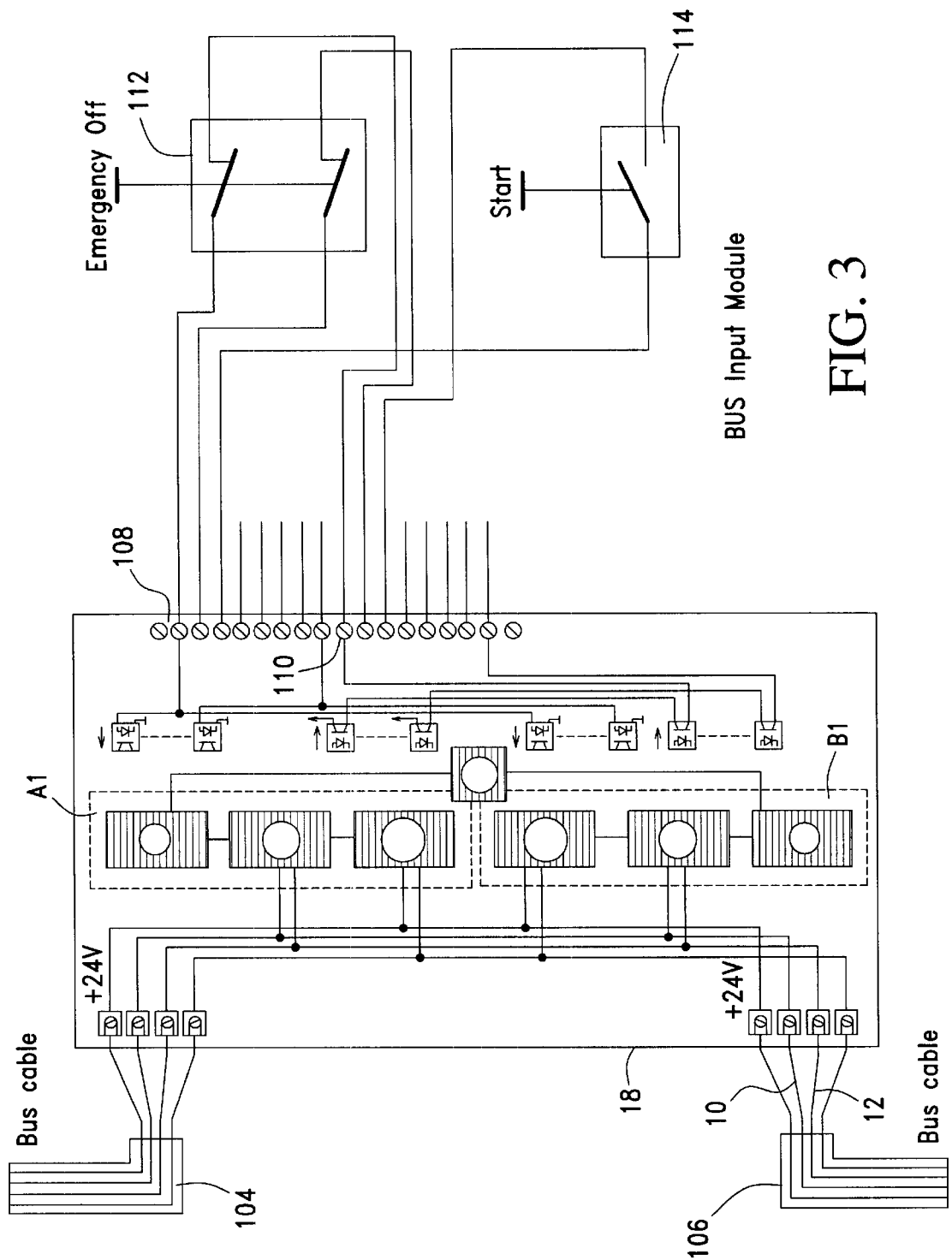
FIG. 3 shows a block diagram of a bus subscriber implemented as input module.

FIG. 3 shows bus subscriber 18 implemented as input module connected with a connecting terminal, which is not described in any detail, to bus cables 104, 106 containing wires 10, 12 and power supply lines. The input module 18 provides inputs 108, 110 etc. for switches, of which an emergency off switch 112 and a start switch 114 are depicted in FIG. 3. Inputs 108, 110 etc. are for instance implemented as connecting terminals connected via galvanically separated lines to the units of bus subscriber 18.

Figure 4:
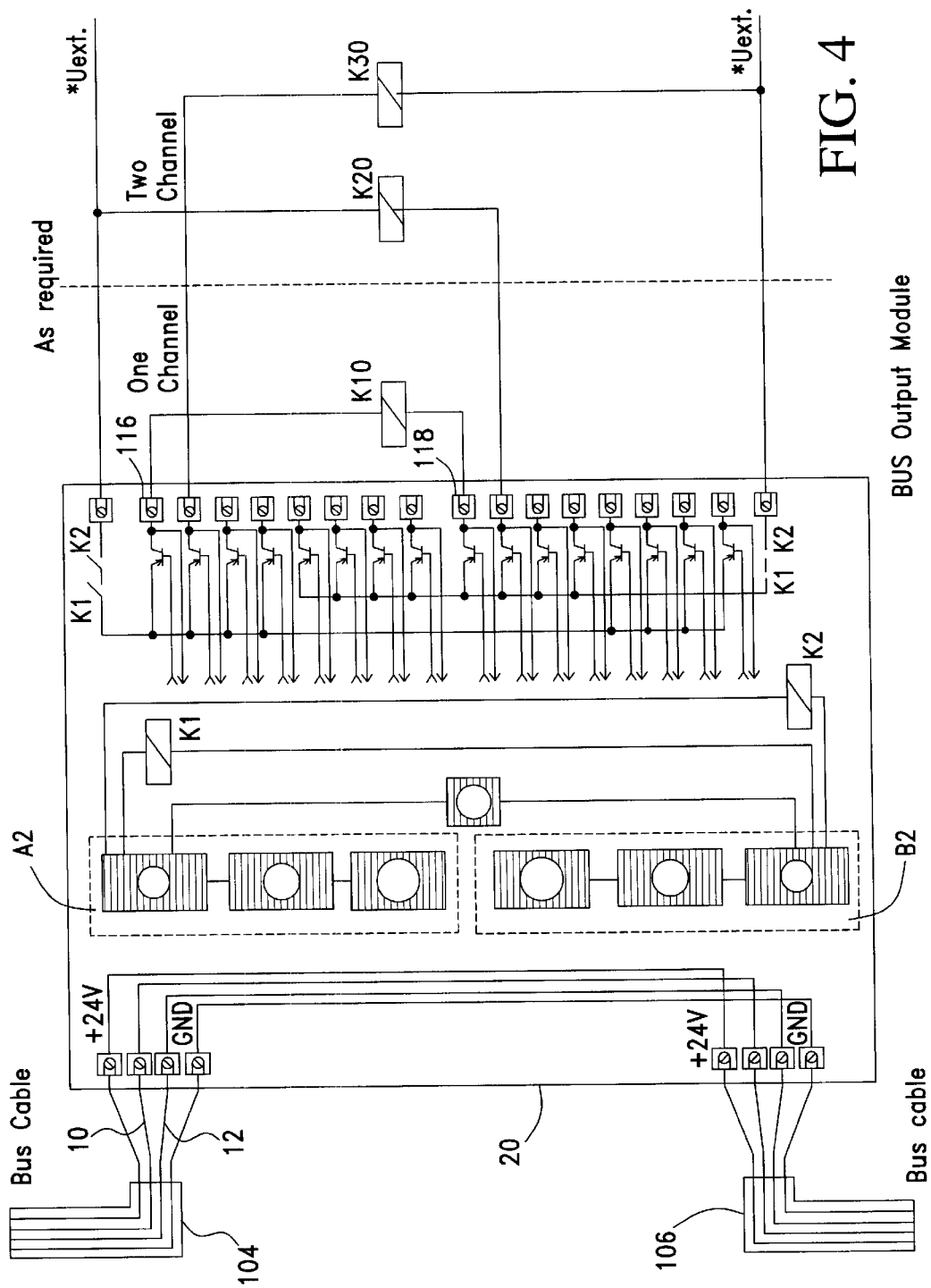
FIG. 4 shows a block diagram of a bus subscriber implemented as output module.

FIG. 4 shows output module 20 connected to bus subscriber 20 again through bus cables 104, 106 with data lines 10, 12 and power supply lines not described in any detail. Protectors K1o, K2o, K3o are connected to bus subscriber 20 as actuators.

While there is only one sensor connecting terminal at the input modules which, galvanically separated, supplies both nodes, for instance outputs 116, 118 are connected to two different connecting terminals galvanically separated for actuators with channel 1 NPN switching, channel 2 PNP switching.

The error messages generated by one module (or a module node) are concurrently sent to each subscriber. Error message processing is carried out independently in each module.

Due to the prescribed external bus line and the prescribed internal wiring of the bus line such faults can be excluded where a destroyed bus line cannot be detected within the fault tolerance time of the system.

We claim:

1. Bus system, comprising a serial bus with a transmission medium (10, 12) with a first active bus subscriber (14) at a first end and a second active bus subscriber (16) at a second end and further bus subscribers (18, 20) serially connected between said first and second ends and physically passed through by the transmission medium, whereby at least the first active bus subscriber (14) or the second active bus subscriber (16) includes a facility capable of regular transmission or receiving of status messages, whereby any one of the bus subscribers (14, 16, 18, 20) checks the status messages generated by another bus subscribers (14, 16, 18, 20) for non-presence within a defined period of time or for deviation from a form indicating an error-free state of the bus system; and, whereby then, if the status messages are not received within the defined period of time or are received in a form deviating from a form indicating error-free state of the bus system, the system is brought into a safe mode.

2. Bus system according to claim 1, wherein the first active bus subscriber (14) checks the status messages of the second active bus subscriber (16) or the second active bus subscriber checks the status messages of the first active bus subscriber.

3. Bus system according to claim 1 wherein the further bus subscribers (18,20) check the status messages generated by the first and second bus subscribers (14, 16, 18, 20) for deviations from the form indicating an error-free state of the transmission medium.

4. Bus system according to claim 1, wherein the transmission medium contains two wires (10, 12).

5. Bus system according to claim 1, wherein at least some of the bus subscribers (14, 16, 18, 20) include two units (A1, B1, A2, B2, AN1, AN) checking each other.

6. Bus system according to claim 1, wherein at least some of the bus subscribers (14, 16, 18, 20) are implemented as modules with two units checking each other (A1, B1, A2, B2, $A_{N1}$, $A_N$) said two units connected to sensors and/or actuators.

7. Bus system according to claim 1, wherein the first and second active bus subscribers (14, 16) are each equipped with a data line connection (23, 34, 26, 28) and that the further bus subscribers (18, 20) are each equipped with a data line input (30, 32, 34, 36) and data line output (38, 40, 42, 44) and that electrical connections (46, 50, 52, 54) of the data line between input and output are implemented as an electrical connection in the form of a conductor path located on a board.

8. Bus system according to claim 1, wherein two intelligent bus controller units (56, 58, 60, 62, 92, 94) each in the bus subscribers (14, 16, 18, 20) are connected independently by spur lines (64, 66, 68, 70, 72, 74, 76, 78) to the electrical connection (46, 50, 52, 54) of the data line (10, 12).

9. Bus system according to claim 8, wherein the spur lines (64, 66, 68, 70, 74, 76, 78) and the electrical connections (46, 50, 52, 54) of the busses (10', 12') or the bus (10, 12) are routed in the bus subscribers (14, 16, 18, 20) to prevent a concurrent interruption or short-circuit.

10. Bus system according to claim 1 wherein the first active bus subscriber (14) comprises two identical links (A0, B0) connected to an optical coupler providing outputs to a relay level or an equivalent safe shut down level.

11. Bus system according to claim 10, wherein a galvanically separated connection for transmission of operational and error messages is intended between identical units (A1, B1, A2, B2 $A_{N1}$, $B_{N1}$, A0, B0).

12. Bus system according to claim 1, wherein one sensor connection per sensor is available at the bus subscribers (14, 16, 18, 20) and wherein the connections are galvanically separated and connected to the two units of the bus subscribers (18, 20).

13. Method for operating a bus system comprising a serial data bus with a transmission medium with a first active bus subscriber at a first end and a second active bus subscriber at the other end as well as further bus subscribers serially connected between said first and second bus subscribers and physically passed through by the transmission medium, comprising the steps of:

at least the first active bus subscriber regularly transmitting and/or receiving status messages at a high design clock rate on the serial bus and, whereby then, if the status messages are not received within the defined period of time or are received in a form deviating from one indicating error-free state of the bus system, by any bus subscriber, the system is brought into a safe mode.

14. Method according to claim 13, wherein the bus subscriber receiving the status messages is at least one of the active bus subscribers.

15. Method according to claim 13, wherein the design time period is 140 ms or below.

16. Method according to claim 13, wherein the clock rate of the status messages of the first and second active bus subscriber (15, 16) in relation to the clock rate of the other bus subscribers (18, 20) is in a ratio of 10:1 to 20:1.

17. Method according to claim 13, wherein the status messages transmitted by the first active bus subscriber are fed back to the first active bus subscriber on the bus upon receipt by the second active bus subscriber and wherein status messages transmitted by the second active bus subscriber are fed back to the second active bus subscriber on the bus upon receipt by the first active bus subscriber.

18. Method according to claim 13, wherein the status messages transmitted by the first and/or the second active bus subscriber are monitored by each bus subscriber and that these messages are checked for non-presence within the defined period of time or for deviation from a form indicating fault-free state of the bus system, and whereby then, if at least one bus subscriber fails to receive the status messages within a defined period of time or receives status messages deviating from the form indicating a fault-free state of the transmission medium, the bus system is brought into a safe state meeting defined safety criteria.

19. Method for monitoring a transmission medium of a serial bus with a first active bus subscriber at one end and a second active bus subscriber at the other end as well as with further bus subscribers serially connected between and physically passed through by the transmission medium, comprising the steps of:

the first and/or second active bus subscriber regularly transmitting and/or receiving status messages on the serial bus at a designed high clock rate and whereby then, if any one of the active bus subscribers fails to receive status messages within a defined period of time or if at least one of the active bus subscribers receives status messages deviating from a form indicating a fault-free state of the transmission medium, the bus system is brought into a safe mode.

20. A bus system comprising:

a transmission medium having a first end and a second end;

a first primary bus subscriber connected to said first end;

a second primary bus subscriber connected to said second end;

any one of said first and second primary bus subscribers including means for transmitting and/or receiving status messages; and, a plurality of secondary bus subscribers serially connected to said transmission medium between said first and second ends, any one of said plurality of secondary bus subscribers including means for transmitting and/or receiving status messages;

wherein any one of said primary bus subscribers and any one of said plurality of secondary bus subscribers checks status messages generated by other primary or secondary bus subscribers and wherein the system is brought into a safe mode if the status messages generated by other primary or secondary bus subscribers are absent for a given period of time or indicate that an error condition exists in the bus system.

21. Method for operating a serial data bus system comprising a first primary bus subscriber and a second primary bus subscriber connected by a transmission medium and a plurality of secondary bus subscribers serially connected to said transmission medium between said first and second primary bus subscribers comprising the steps of:

sending a status message from said first primary bus subscriber to said second primary bus subscriber through at least one of said plurality of secondary bus subscribers; and, placing the bus system in a safe mode in the event that either 1) the status message is not received by said any one of the plurality of secondary bus subscribers or 2) the message received by said any one of the plurality of secondary bus subscribers indicates an error condition.

* * * * *